United States Patent
Salas et al.

[11] Patent Number: 5,931,174
[45] Date of Patent: Aug. 3, 1999

[54] APPARATUS AND METHOD FOR CLEANING ARTICLES

[75] Inventors: Paul Salas, Thousand Oaks; Steve Rush, Acton, both of Calif.

[73] Assignee: Eaton Corporation, Cleveland, Ohio

[21] Appl. No.: 08/876,649

[22] Filed: Jun. 16, 1997

[51] Int. Cl.[6] .................................................. B08B 3/04
[52] U.S. Cl. .................................................. 134/89; 134/85
[58] Field of Search ............................. 134/169 A, 109, 134/61, 76, 83, 84, 85, 89, 111

[56] References Cited

U.S. PATENT DOCUMENTS

| | | | |
|---|---|---|---|
| 3,973,987 | 8/1976 | Hewitt et al. | 134/12 |
| 4,364,775 | 12/1982 | Starkovich | 134/3 |
| 4,635,666 | 1/1987 | Daley et al. | 134/172 |
| 4,736,759 | 4/1988 | Coberly et al. | 134/66 |
| 4,886,082 | 12/1989 | Kato et al. | 134/60 |
| 5,030,591 | 7/1991 | Cole et al. | 502/402 |
| 5,178,769 | 1/1993 | Simpson et al. | 210/671 |
| 5,183,067 | 2/1993 | Slinn | 134/61 |
| 5,298,079 | 3/1994 | Guymon | 134/16 |
| 5,327,920 | 7/1994 | Gerard et al. | 134/57 R |
| 5,348,588 | 9/1994 | Winston | 134/10 |
| 5,421,883 | 6/1995 | Bowden | 118/73 |
| 5,482,061 | 1/1996 | Bell | 134/56 R |
| 5,490,531 | 2/1996 | Bala et al. | 134/109 |
| 5,577,522 | 11/1996 | Barkley et al. | 134/111 |
| 5,782,983 | 7/1998 | Inada et al. | 134/1 |
| 5,795,400 | 8/1998 | Berger et al. | 134/10 |
| 5,849,100 | 12/1998 | Bowden | 134/10 |

*Primary Examiner*—Jill Warden
*Assistant Examiner*—Paul J. Lee
*Attorney, Agent, or Firm*—Tarolli, Sundheim, Covell Tummino & Szabo

[57] ABSTRACT

An apparatus for use in removing oil containing contaminants from articles includes a wash station and a rinse station. At the wash station, the articles are immersed in a tank of wash water containing detergent to remove oil containing contaminants from the articles. A flow of wash water containing the detergent and oil is conducted through an oil retainer. The oil is removed from the wash water and retained by the oil retainer. A flow of wash water which contains detergent and is substantially free of oil, is conducted from the oil retainer apparatus back to the wash tank. After having been removed from the wash tank, the articles are immersed in deionized rinse water in a rinse tank to remove detergent and any remaining oil containing contaminants from the articles. A flow of rinse water is conducted through a rinse water conditioning apparatus which includes a carbon pack filter which removes organic materials from the rinse water and a deionization apparatus which deionizes the water to remove any inorganic materials. The deionized water is returned to the rinse tank.

18 Claims, 4 Drawing Sheets

APPARATUS AND METHOD FOR CLEANING ARTICLES

BACKGROUND OF THE INVENTION

An improved cleaning apparatus and method is provided to remove oil and contaminants from articles and to condition wash and rinse water for reuse.

Article cleaning systems have previously cleaned articles using suitable soaps or detergents to remove oil and other contaminants from the articles. Waste water containing soap or detergent and other contaminants has been conducted to a drain or sewer system. When a direct discharge of waste water to a drain or sewer system is objectionable, the waste water from known cleaning systems has been eliminated by being conducted to containers and then disposed of in a suitable manner.

SUMMARY OF THE INVENTION

The present invention provides a self-contained and portable apparatus for use in cleaning articles without discharging waste water. The apparatus includes a wash tank which holds detergent containing wash water in which articles are immersed to remove oil containing contaminants from the articles. The articles are withdrawn from the wash tank and subsequently immersed in rinse water in a rinse tank.

The wash water, containing detergent and oil which has been removed from the articles as they are cleaned, is conducted through a wash water conditioning apparatus. The wash water conditioning apparatus removes the oil from the wash water. The wash water, containing the detergent, is conducted from the wash water conditioning apparatus back to the wash tank. This effectively eliminates the need for disposal of wash water.

The rinse water is conducted from the rinse tank through a rinse water conditioning apparatus. The rinse water conditioning apparatus includes a filter which removes oil and other organic contaminants from the rinse water. The rinse water is then conducted through a deionization apparatus. The deionization apparatus removes inorganic materials and deionizes the rinse water. The rinse water is then conducted back to the rinse tank. This effectively eliminates the need for disposal of rinse water.

BRIEF DESCRIPTION OF THE DRAWINGS

The foregoing and other features of the invention will become more apparent upon a consideration of the following description taken in connection with the accompanying drawings wherein.

DESCRIPTION OF ONE SPECIFIC PREFERRED EMBODIMENT OF THE INVENTION

Figure 1:
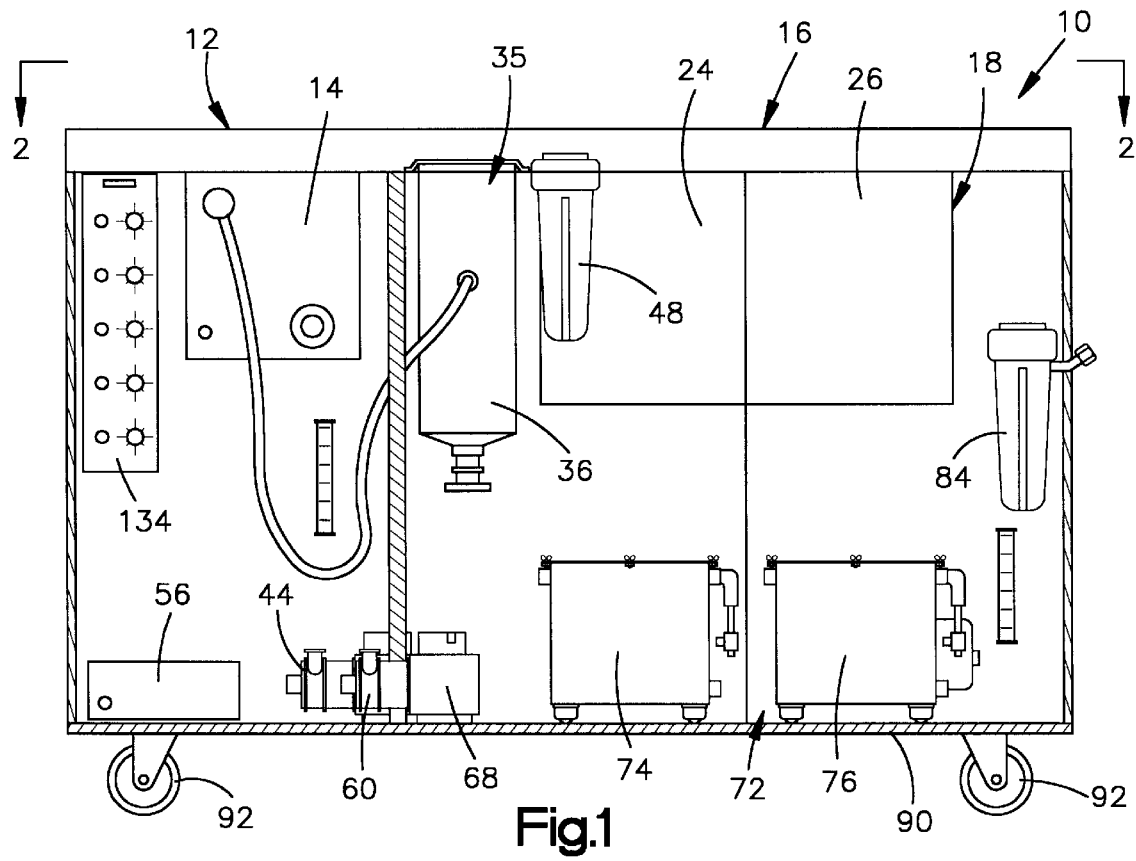
FIG. 1 is a simplified elevational view, with side panels removed, of a portable cleaning apparatus constructed in accordance with the present invention.

An apparatus 10 (FIGS. 1–3) for use in cleaning articles includes a wash station 12 at which a wash tank 14 is disposed. The wash tank 14 holds a body of deionized water to which a detergent has been added. In addition, the cleaning apparatus 10 includes a rinse station 16 at which there is a rinse tank 18. The rinse tank 18 holds a body of deionized rinse water.

The articles to be cleaned have surfaces covered with oil and/or other contaminants resulting from a manufacturing process. The contaminants may include tramp oil, metal chips, colloids, etc. The oil in the contaminants may be animal, vegetable, mineral or synthetic oils.

Figure 3:
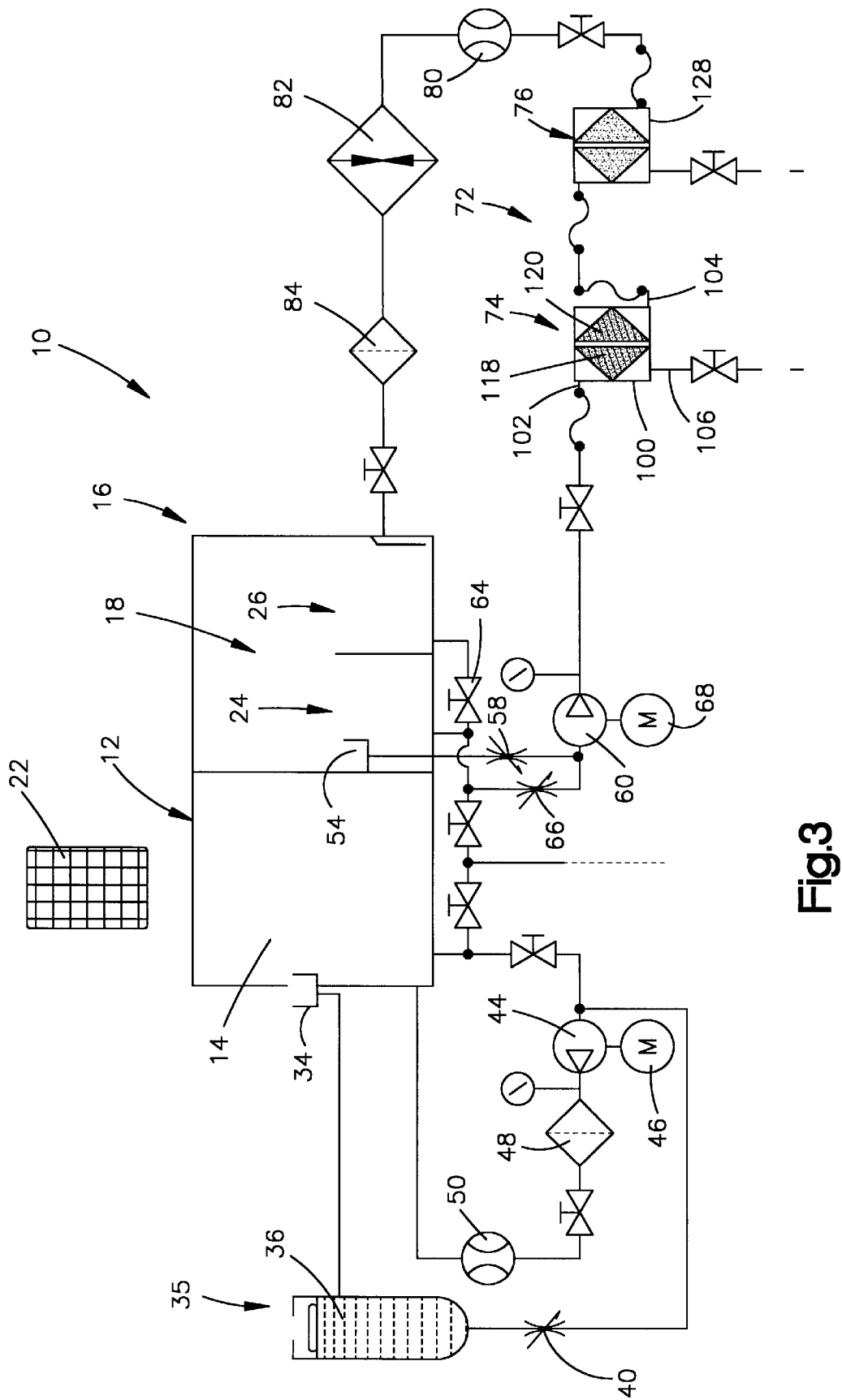
FIG. 3 is a schematic illustration depicting the wash station, rinse station, apparatus associated with the wash station, and apparatus associated with the rinse station.

The articles are placed in a basket 22 (FIG. 3). The basket 22 has a generally rectangular box-like construction and is formed of an open mesh material which allows water to pass therethrough. After articles to be cleaned have been placed in the basket 22, handles (not shown) on the basket are manually grasped. The basket 22, with the articles to be cleaned therein, is lowered into detergent containing wash water in the wash tank 14.

After the articles in the basket 22 have been washed, the basket is manually lifted from the wash tank 14. After an appropriate dwell time, the basket 22 is lowered into the rinse tank 18. The articles in the basket are submerged in a body of rinse water in the rinse tank 18. After the articles in the basket 22 have been rinsed, the basket is removed from the rinse tank and the articles are dried.

Figure 2:
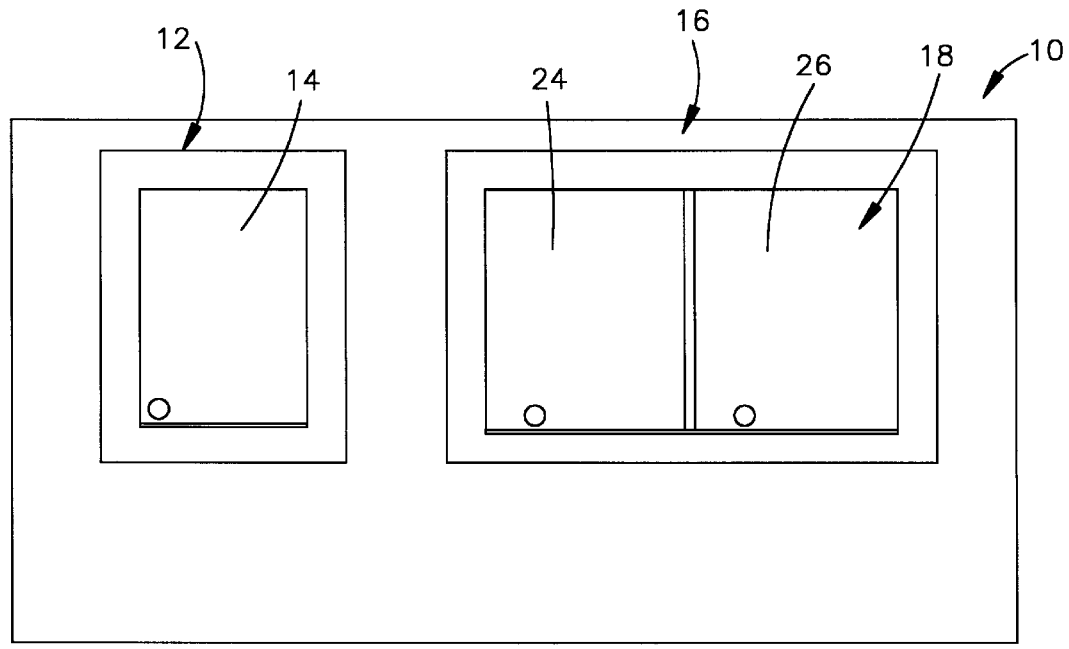
FIG. 2 is a simplified plan view, taken generally along the line 2—2 of FIG. 1, illustrating the relationship between a wash station and a rinse station in the apparatus of FIG. 1.

The rinse tank 18 is divided into two sections, that is an initial rinse section 24 and a final rinse section 26 (FIGS. 1–3). The initial rinse section 24 and final rinse section 26 of the rinse tank 18 both hold deionized rinse water. The basket 22 of washed articles is first manually lowered into the initial rinse section 24 of the rinse tank 18 and immersed in the rinse water. The basket of articles is then manually lifted from the initial rinse section 24 and lowered into the final rinse section 26 of the rinse tank 18. It should be understood that the rinse tank 18 could have a different construction if desired. For example, the rinse tank could have an additional rinse section.

After the articles have been immersed in the final rinse section 26 of the rinse tank 18, the basket is withdrawn from the rinse tank and the articles are dried. It is contemplated that the articles may be dried in either ambient air or in ovens. The articles may be dried in the basket 22 or may be removed from the basket and dried. If desired, suitable portable power operated devices could be utilized to assist in moving the basket 22 into and out of the wash tank 14 and rinse tank 18.

In accordance with one of the features of the present invention, wash water containing detergent and oil and/or other contaminants is continuously withdrawn from the wash tank 14. The oil and/or other contaminants are removed from the wash water. The oil includes animal, vegetable, mineral or synthetic oils. The synthetic oils includes polyolefins and polyesters. These may be free floating, mechanically dispersed and/or chemically dispersed/emulsified.

The wash water is then returned to the wash tank 14 with the detergent still present in the wash water. By recirculating and cleaning the wash water in this manner, it is not necessary to dispose of contaminated wash water. Therefore, the wash tank 14 does not have to be connected with a drain or sewer system to eliminate dirty wash water.

The wash water is conducted from a collection trough 34 (FIG. 3) formed as a portion of the wash tank 14. The wash water is conducted from the collection trough 34 to a wash water conditioning apparatus 35. The wash water conditioning apparatus 35 includes an absorption type oil filter or retainer 36.

The oil retainer 36 is effective to remove and retain oil and/or other contaminants from the wash water. However, the oil retainer 36 is ineffective to remove detergent from the wash water. Therefore, the wash water and detergent pass through the oil retainer 36 while the oil and/or other contaminants are removed from the wash water by the oil retainer 36. If desired, the wash water conditioning apparatus 35 could include devices other than the oil retainer 36. The oil retainer 36 may remove contaminants other than oil from the wash water.

During operation of the cleaning apparatus 10, there is a continuous flow of used wash water into the oil retainer 36. There is also a continuous flow of clean, detergent containing wash water from the oil retainer 36. A valve 40 (FIG. 3) is adjustable to control the rate of flow of wash water through the oil retainer 36.

A wash water pump 44 (FIG. 3) induces a continuous flow of wash water from the collection trough 34 through the oil retainer 36 and valve 40 back to the wash tank 14. The wash water pump 44 is driven by a motor 46. The wash water conducted from the pump 44 passes through a 20 micron nominally rated filter 48 and a flow control orifice or meter 50. The filter 48 could be a 5 to 50 micron filter.

A heater 53 (FIG. 5) heats the wash water in the wash tank 14. An ultrasonic generator 56 agitates the wash water in the wash tank 14. However, it should be understood that the wash water in the tank 14 could be agitated in a manner other than by the use of an ultrasonic generator. For example, it is contemplated that there may be agitation by up and down motion of the basket 22 of parts in the wash tank 14.

In accordance with another feature of the invention, the rinse water is continuously withdrawn from the initial rinse section 24 (FIGS. 1–3). The rinse water is cleaned and returned to the rinse tank 18. This effectively eliminates any necessity of connecting the rinse tank 18 with a drain or sewer system. Any loss of either wash water from the wash tank 14 or rinse water from the rinse tank 18 is compensated for by adding deionized water to the wash tank and/or rinse tank during operation of the cleaning apparatus 10. Any loss of detergent from the wash tank 14 is compensated for by adding detergent to the wash tank.

Rinse water from the surface of the body of water in the initial rinse section 24 of the rinse tank 18 is conducted from a collection trough 54 (FIG. 3) in the initial rinse section of the rinse tank. In addition, rinse water is conducted from the bottom of the initial rinse section 24. Water from the collection trough 54 passes through a needle adjust valve 58 to a rinse water pump 60. Rinse water flows from the bottom of the initial rinse section 24 through a needle adjust valve 66 to the rinse water pump 60. Rinse water flows from the final rinse section 26 of the rinse tank over the divider into initial rinse section 24.

During operation of the apparatus 10, detergent and oil and/or other contaminants are carried from the wash tank 14 to the rinse tank 18 by the basket 22 and articles in the basket. To remove these contaminants, the rinse water pump 60 causes the rinse water to flow through a rinse water conditioning apparatus 72 back to the final rinse section 26 of the rinse tank 18. The rinse water conditioning apparatus 72 essentially removes detergent, oil and/or other contaminants from the rinse water. In addition, the rinse water conditioning apparatus 72 deionizes the rinse water before it is returned to the rinse tank 18. The rinse water is continuously recirculated by the rinse water pump 60.

The rinse water conditioning apparatus 72 (FIG. 3) includes a carbon pack filter 74 which removes organic impurities from the rinse water. The rinse water conditioning apparatus 72 also includes a deionization apparatus 76. The deionization apparatus 76 is protected against organic fouling by the presence of the carbon pack filter 74. The deionization apparatus 76 removes inorganic salts and like inorganic complexes from the rinse water and returns the rinse water to a high level of water purity.

Figure 5:
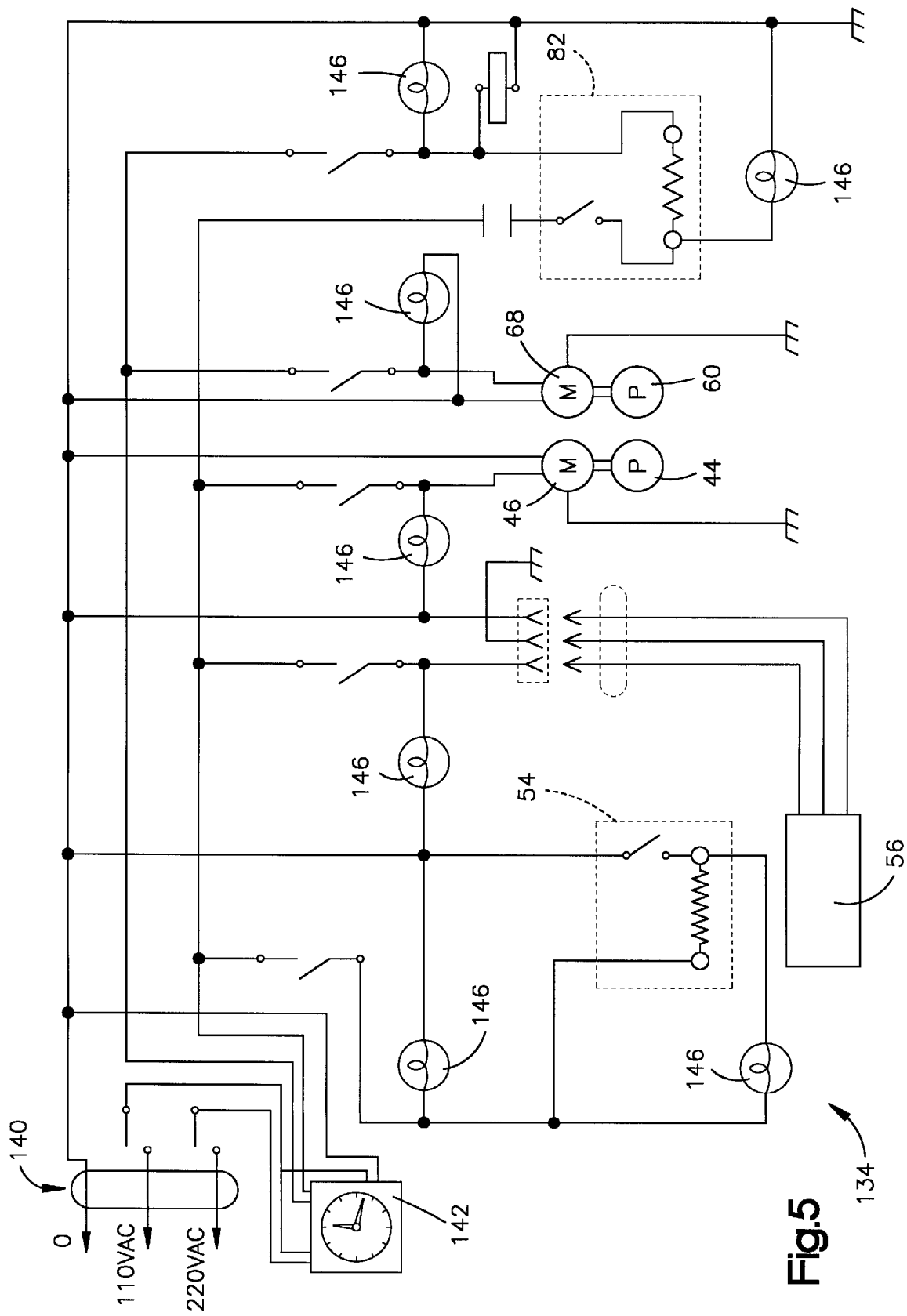
FIG. 5 is a schematic illustration depicting electrical apparatus associated with the wash station and rinse station in the apparatus of FIGS. 1–3.

The deionized rinse water is conducted from the rinse water conditioning apparatus 72 through a flow meter 80 (FIG. 3) to a flow through heater 82 (FIGS. 3 and 5). The flow through heater 82 heats the rinse water to a desired temperature. It is contemplated that additional heaters could be provided in the rinse tank 18 if desired. The cleaned and heated rinse water flows from the heater 82 through a 20 micron filter 84 into the final rinse section 26 of the rinse tank 18.

The use of deionized wash water in the wash tank 14 and deionized rinse water in the rinse tank 18 eliminates any tendency for a reaction to occur between the wash water or rinse water and the articles being cleaned. The materials forming the components of the cleaning apparatus 10 exposed to either the wash water or the rinse water are non-shedding and are made of plastics or corrosion resistant steels. Of course, this minimized any possibility of interaction with the articles being cleaned. Components of the cleaning apparatus 10 which are not exposed to either the wash water or the rinse water may be made of other materials, such as carbon steel, which have been powder coated and fused to prevent reactions with the wash water or the rinse water.

Since the wash water is cleaned by the wash water conditioning apparatus 35 and recirculated by the pump 44 and since the rinse water is cleaned by the rinse water conditioning apparatus 72 and recirculated by the rinse water pump 60, it is not necessary to connect the cleaning apparatus 10 with a drain or sewer system. Therefore, the cleaning apparatus 10 is portable and can be moved between various locations where it is needed. The cleaning apparatus is disposed on a base 90 (FIG. 1) having wheels 92 which facilitate movement of the cleaning apparatus 10 along a floor or other support surface.

Wash Water Conditioning Apparatus

The wash water retainer 36 (FIG. 3) removes and retains oil and other hydrocarbons from a flow of wash water and detergent. The oil retainer 36 does not remove detergent from the wash water. Surprisingly, the flow of wash water and detergent through the oil retainer 36 does not remove oil from the oil retainer, once the oil is absorbed in the filter media.

The oil retainer 36 is formed of a porous polymer which is highly oleophyllic. As oil from the wash water is absorbed by the retainer 36, the oil combines with polymers in the retainer. As the oil is absorbed, it is believed that the molecular structure of the retainer polymers change to a molecular structure similar to that of rubber. Once the oil has been removed from the wash water and absorbed by the oil retainer 36, the oil cannot be forced from the retainer by merely compressing the retainer. Therefore, disposal of an oil retainer 36, which has become fully impregnated with oil, is facilitated.

The material of the oil retainer 36 is an elastomeric ethylene/alpha-olefin copolymer. The material of the oil retainer 36 may optionally be copolymerized with a diene, in a subdivided form. The resulting material from which the oil retainer 36 is formed is characterized by a high absorbing effectiveness and a low specific gravity. After absorbing oil and similar oil like hydrocarbons, the material of the oil retainer 36 forms a jelly, homogeneous mass which is similar to rubber. If desired, the oil retainer 36 could have a different construction which would result in the removal of oil and/or other contaminants from the wash water without removing the detergent.

In one specific embodiment of the invention, the material contained in the oil retainer 36 was obtained from Haz-Mat Response Technologies, Inc. of 4626 Santa Fe Ave., San Diego, Calif. The oil retainer 36 may contain material having a composition similar to the composition of the materials described in U.S. Pat. No. 5,304,311 issued Apr. 19, 1994 and entitled "Method For Removing Hydrocarbon Products From The Surface Of An Aqueous Medium". It should be understood that the foregoing description of specific material for the oil retainer 36 has been set forth herein for purposes of clarity of description and not for purposes of limitation of the invention.

The detergent which is utilized in the wash tank 14 is conducted through the oil retainer 36 with the wash water. The oil retainer 36 does not remove the detergent from the wash water. The flow of wash water and detergent does not remove the oil containing contaminants from the oil retainer 36.

The detergent is a mild alkaline synthetic detergent mixture which is infinitely water soluble. The detergent does not contain ethylene glycol monobutyl ether. In fact the detergent does not contain any glycol ether complexes.

One specific silicated nonglycol ether detergent which may be utilized is Brulin Formula 815GD. This specific detergent is commercially available from Brulin & Company Inc. of 2920 Dr. Andrew J. Brown Ave., Indianapolis, Ind. This detergent has the following composition, in decreasing order, by weight:

| | |
|---|---|
| water | 80–85% |
| nonylphenoxypolyethyleneoxyethanol | 5–10% |
| sodium metasilicate | |
| trisodium phosphate | |
| sodium tripolyphosphate | |
| cocoa amphopropianate C12, fatty acids | |
| a blend of monethanolamine and triethanolamine | |
| potassium hydroxide | |
| sodium hydroxide. | |

Although it is believed that Brulin Formula 815GD may be a preferred detergent, other detergents may be utilized if desired.

The oil retainer 36 does not absorb the nonylphenoxypoly-ethyleneoxyethanol in the detergent. Therefore the detergent maintains its cleaning capabilities. In addition the oil retainer 36 does not absorb the salt ingredients and the primary and tertiary amines. Specifically, the oil retainer 36 does not absorb the sodium metasilicate, trisodium phosphate, sodium tripolyphosphate, potassium hydroxide, and sodium hydroxide and the blend of monethanolamine and triethanolamine.

Rinse Water Conditioning Apparatus

The rinse water conditioning apparatus 72 (FIG. 3) includes the carbon pack filter 74 and the deionization apparatus 76. The carbon pack filter 74 removes oil and other organic contaminants from the rinse water before they can enter the deionization apparatus 76. It is preferred to use granulated activated carbon in the carbon pack 74. Specifically, it is preferred to use 12 by 30 mesh coconut carbon in the carbon pack filter 74. The carbon pack filter 74 contains approximately 0.4 cubic feet of the granulated activated carbon. The carbon may be obtained from Acme Carbon of Gardina, California under the designation PK-60. However, it is contemplated that other known filter materials having a high effective organic absorbing potential may be utilized if desired.

Figure 4:
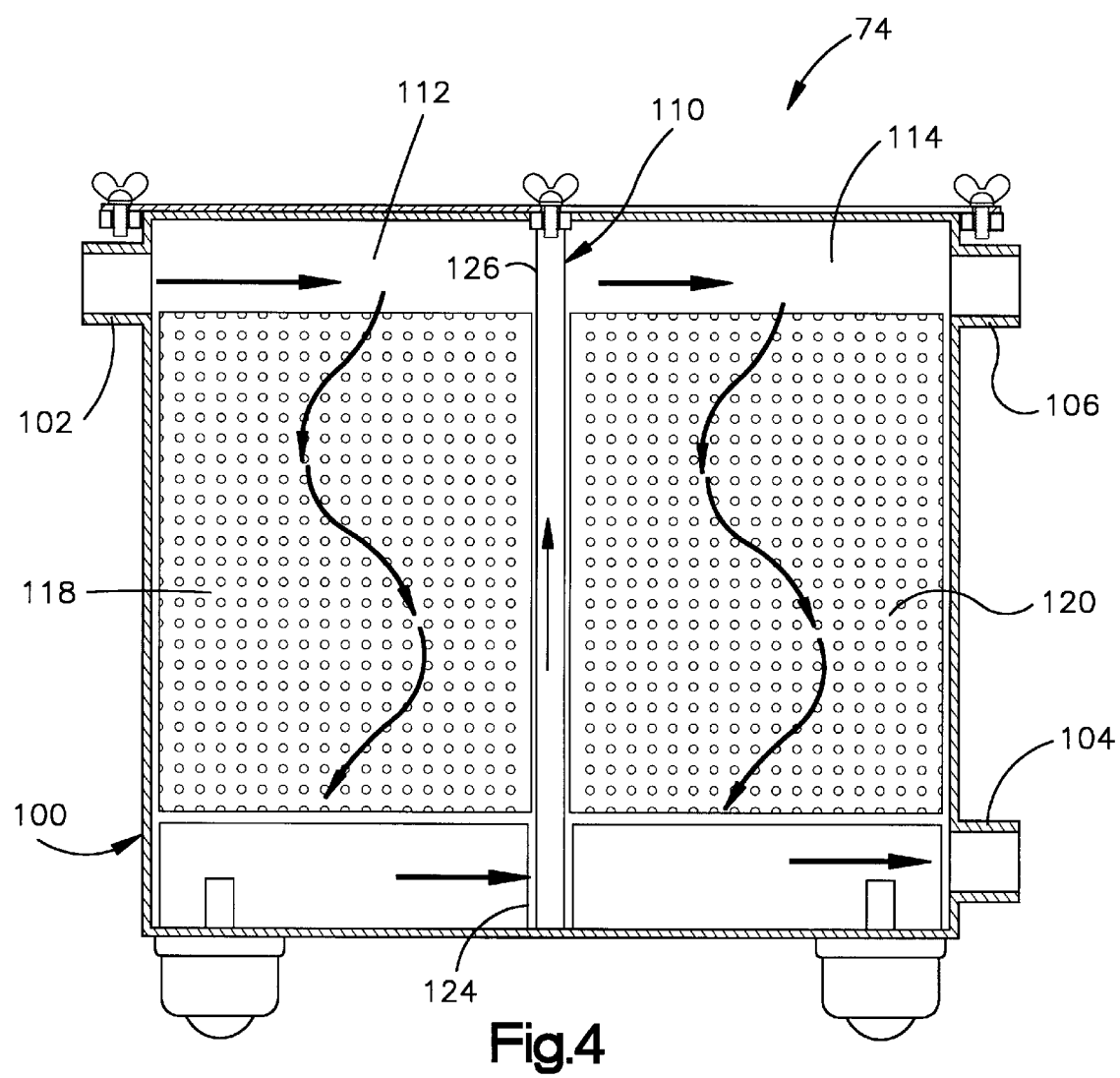
FIG. 4 is an enlarged fragmentary schematic illustration of one conditioning tank used in the apparatus of FIGS. 1–3.

The construction of the carbon pack filter 74 is illustrated in FIG. 4. The carbon pack filter 74 includes a housing 100 having an inlet 102 through which a continuous flow of rinse water from the rinse water pump 60 enters the carbon pack filter 74. The rinse water leaves the carbon pack filter 74 through an outlet 104 from the housing 100. A test or inspection port 106 is provided at an upper end portion of the housing 100. The test port 106 is provided to facilitate testing the purity of the water.

A hollow wall 110 (FIG. 4) divides the housing into an inlet compartment 112 and an outlet compartment 114. An inlet carbon pack 118 is disposed in the inlet compartment 112. An outlet carbon pack 120 is disposed in the outlet compartment 114. The inlet and outlet carbon packs 118 and 120 have the same construction and are interchangeable.

The rinse water flows downward through the inlet carbon pack 118. The rinse water then flows upward from an entrance (not shown) in a lower portion 124 of the hollow wall 110 to an exit (not shown) in an upper portion 126 of the hollow wall 110. The rinse water then flows downward through the outlet carbon pack 120. Thus, there is a continuous downward flow of rinse water through both the inlet and outlet carbon packs 118 and 120. The inlet and outlet carbon packs 118 and 120 are commercially available from Whale Feather Designs of 31535 Indian Oak Road, Acton, Calif. Of course, other known carbon filter packs could be utilized. However, it is believed that it will be preferred to have a down flow of rinse water through the carbon packs 118 and 120.

The deionization apparatus 76 (FIG. 3) removes inorganic materials from the rinse water and deionizes the rinse water. Therefore, inorganic compounds in the detergent are removed from the rinse water by the deionization apparatus 76. The deionization apparatus 76 includes a housing 128 (FIG. 3) having the same construction as the housing 100 of the carbon pack filter 74. The housing for the deionization apparatus 76 is divided into two compartments by a hollow wall through which a continuous up flow of rinse water is conducted between the two compartments of the housing.

Mixed bed resin packs are provided in inlet and outlet compartments, corresponding to the inlet compartment 112 and outlet compartment 114 (FIG. 4), of the deionization apparatus 76. The mixed bed resin packs in the deionization apparatus 76 remove soluble salts and other dissolved inorganic compounds from the rinse water. Very clean, deionized rinse water is continuously conducted from the outlet of the deionization apparatus 76 back to the rinse tank 18. A suitable mixed bed resin pack is commercially available from Whale Feather Designs of 31535 Indian Oak Road, Acton, Calif. The mixed bed resin is a 40% cation and 60% anion mixture of ion exchange resins. Of course, other known mixed bed resin packs could be utilized if desired.

Operation

Electrical controls 134 for the cleaning apparatus 10 are illustrated schematically in FIG. 5. The electrical controls are connected with suitable sources of alternating current at 140 in FIG. 5. A timer 142 is provided to indicate set point for daily operation start-up and finish. The timer 142 indicates the length of time which a basket 22 (FIG. 3) of articles is disposed in the wash tank 14 and rinse tank 18. The motors 44 and 60 for the wash water pump 46 and rinse water pump 68 are energized through the timer 142. Suitable lamps 146 are provided to indicate when the various components of the electrical controls 134 are energized.

Upon start-up of the cleaning apparatus 10 (FIG. 3), approximately two hours should be provided to enable the wash water and the rinse water to reach the desired operating temperatures. Upon start-up, the motor 46 for driving the wash water pump 44 is energized to continuously circulate the wash water. At this time, the level of wash water in the wash tank 14 is checked and, if the water level is low, deionized water is added. In addition, if required, detergent is added to the water in the wash tank 14.

The oil retainer 36 is then checked to be certain that it is not fully saturated with oil. When the oil retainer 36 becomes fully saturated with oil, it turns into a material similar to rubber and becomes hard to the touch and must be replaced. The used oil retainer is disposed of as solid waste and, usually, does not require any special disposal procedures.

After the detergent in the wash water has become thoroughly mixed and has been circulated for a period of time by the wash water pump 44, the concentration of detergent in the wash water is checked. This may be done in a known manner in association with a test kit which is available from Brulin & Company Inc. under the designation number 431–604. There should be a concentration of approximately 5% to 8% of detergent in the wash water, as measured by the above test kit method. During operation of the cleaning apparatus 10, the wash water should be maintained at a temperature of between 150 degrees and 165 degrees Fahrenheit.

The motor 68 for the rinse water pump 60 is energized to continuously circulate the rinse water. The level of the rinse water in the rinse tank 18 should be checked to determine if the desired amount of rinse water is present in the tank. The needle valves 58 and 66 (FIG. 3) should be adjusted to assure a rinse water flow which is sufficient to prevent starvation of the rinse water pump 60. If there is a deficiency in the amount of rinse water in the rinse tank 18, this deficiency should be remedied by the addition of deionized water to the rinse tank 18.

The rinse water should be checked to make certain that the carbon packs 118 and 120 in the carbon pack filter 74 do not need replacing or that the mixed bed resin packs in the deionization apparatus 76 do not need replacing. The resistivity of the rinse water should be at least 500,000 ohm-cm$^2$. This may be checked at the test ports with a resistivity probe. The resistivity of rinse water drawn from the deionization apparatus 76 should be at least 250,000 ohms-cm$^2$. The initial fill water should have a minimum resistivity of 1,000,000 ohm-cm$^2$. The deionized water in the rinse tank 18 should be at a temperature of 120 degrees to 130 degrees Fahrenheit during operation of the cleaning apparatus 10.

Once the wash water in the tank 14 has reached the desired temperature and the rinse water in the tank 18 has reached the desired temperature, the cleaning apparatus 10 may be used to clean articles. The articles are placed in the basket 22 and immersed in the detergent containing wash water in the wash tank 14. At this time, the ultrasonic generator 56 (FIG. 5) is energized to agitate the wash water. In addition, the basket 22 (FIG. 3) may be reciprocated vertically with short strokes.

Depending upon the cleanliness of the articles in the basket 22, it is contemplated that it would probably be desired to have the basket 22 in the wash tank 14 for 5 to 10 minutes. The basket 22, with the articles therein, is then transferred from the wash tank 14 to the rinse tank 18. The excess wash water is drained from the articles by holding the basket of articles above the wash tank 14. After a dwell time sufficient to allow for effective drainage, the basket of articles is transferred to the rinse tank 18. This minimizes detergent drag out and prevents unnecessary rinse water contamination. However, the articles in the basket 22 are not allowed to dry before they are submerged in the rinse water in the rinse tank 18.

The basket 22, with the articles therein, is immersed in the rinse water at the initial rinse station 24 of the rinse tank 18. The articles are maintained submerged in the rinse water at the initial rinse station 24 for approximately 5 minutes. The basket 22 and the articles therein are withdrawn from the initial rinse station 24 and immersed in the rinse water at the final rinse station 26. The articles are maintained in the rinse water at the final rinse station 26 for 3 to 5 minutes. After the basket 22 and articles have been withdrawn from the rinse tank 18, they may be room air dried or dried using filtered gaseous nitrogen. If desired, the articles may be oven dried.

During testing of one specific embodiment of the apparatus 10, the previously described start-up routine was followed. After checking the wash water and rinse water, two quarts of oil were added to the wash water. The oil retainer 36 removed the oil from the wash water and return the wash water and detergent to a satisfactory condition for use in cleaning articles. When this specific embodiment of the apparatus 10 is used in one specific production situation, it is believed that the apparatus may be used for more than twelve months before the oil retainer 36 needs to be replaced. Of course, the length of time for which the apparatus 10 may be used without replacing the oil retainer 36 depends on the amount of oil containing contaminants on the articles and the total number of articles being cleaned.

Conclusion

The present invention provides a self-contained and portable apparatus 10 (FIGS. 1–3) for use in cleaning articles without discharging waste water. The apparatus 10 includes a wash tank 14 which holds detergent containing wash water in which articles are immersed to remove oil containing contaminants from the articles. The articles are withdrawn from the wash tank 14 and subsequently immersed in rinse water in the rinse tank 18.

The wash water, containing detergent and oil which has been removed from the articles as they are cleaned, is conducted through a wash water conditioning apparatus 35. The wash water conditioning apparatus 35 removes the oil from the wash water. The wash water, containing the detergent, is conducted from the wash water conditioning apparatus 35 back to the wash tank 14. This effectively eliminates the need for disposal of wash water.

The rinse water is conducted from the rinse tank 18 through a rinse water conditioning apparatus 72. The rinse water conditioning apparatus 72 includes a filter 74 which removes oil and other organic contaminants from the rinse water. The rinse water is then conducted through a deionization apparatus 76. The deionization apparatus 76 removes inorganic materials and deionizes the rinse water. The rinse water is then conducted back to the rinse tank 18. This effectively eliminates the need for disposal of rinse water.

Having described the invention, the following is claimed:

1. An apparatus for use in removing contaminants containing oil from articles, said apparatus comprising a wash tank which holds a body of wash water containing a detergent and which receives the articles from which contaminants containing oil are to be removed, a wash water conditioner having a surface which engages a flow of wash water containing detergent and contaminants containing oil and which reacts with the contaminants containing il to remove the contaminants containing oil from the flow of wash water and is ineffective to remove the detergent from the flow of wash water, said surface which engages a flow of wash water is at least partially formed of polymers which combine with oil in the contaminants containing oil in the wash water, and pump means for inducing a flow of wash water containing detergent and contaminants containing oil from said wash tank to said wash water conditioner and for inducing a flow of wash water containing detergent and free of contaminants containing oil from said wash water conditioner to said wash tank.

2. An apparatus as set forth in claim 1 wherein said surface which engages a flow of wash water is at least partially formed of a porous polymer which is oleophyllic.

3. An apparatus as set forth in claim 1 wherein said surface which engages a flow of wash water is at least partially formed of polymers which absorb oil from the wash water and which change in molecular structure as the oil is absorbed.

4. An apparatus as set forth in claim 1 wherein said surface which engages a flow of wash water is at least partially formed of an elastomeric ethylene/alpha-olefin copolymer.

5. An apparatus as set forth in claim 1 wherein said surface which engages a flow of wash water is ineffective to absorb nonylphenoxypoly-ethyleneoxyethanol from the detergent contained in the wash water.

6. An apparatus as set forth in claim 1 wherein said surface which engages a flow of wash water is ineffective to absorb salt ingredients and primary and tertiary amines from the detergent contained in the wash water.

7. An apparatus as set forth in claim 1 wherein said surface which engages a flow of wash water is ineffective to absorb sodium metasilicate, trisodium phosphate, and sodium tripolyphosphate from the detergent contained in the wash water.

8. An apparatus as set forth in claim 1 wherein said surface which engages a flow of wash water is ineffective to absorb potassium hydroxide and sodium hydroxide from the detergent contained in the wash water.

9. An apparatus as set forth in claim 1 further including a rinse tank adjacent to said wash tank to hold rinse water and to receive articles which have been immersed in wash water containing detergent in said wash tank, a rinse water conditioner connected in fluid communication with said rinse tank to remove detergent and contaminants containing oil from the rinse water, and second pump means for inducing a flow of rinse water containing detergent and contaminants containing oil from said rinse tank and for inducing a flow of rinse water which is substantially free of detergent and contaminants containing oil from said rinse water conditioner to said rinse tank.

10. An apparatus as set forth in claim 1 wherein said rinse water conditioner includes a housing containing an inlet compartment, an outlet compartment, and a conduit extending from a lower end portion of said inlet compartment to an upper end portion of said outlet compartment, said housing having a rinse water inlet connected with an upper end portion of said inlet compartment and a rinse water outlet connected with a lower end portion of said outlet compartment, said rinse water conditioner further includes an inlet carbon pack disposed in said inlet compartment and an outlet carbon pack disposed in said outlet compartment.

11. An apparatus as set forth in claim 1 further including an ultrasonic generator which is operable to agitate the wash water in said wash tank.

12. A portable apparatus for use in removing contaminants containing oil from articles, said apparatus comprising a base having wheels to enable said base to be readily moved from one location to another location, a wash tank disposed on said base to hold wash water containing detergent and to receive articles from which contaminants containing oil are to be removed, a rinse tank disposed on said base to hold rinse water and to receive articles which have been immersed in wash water containing detergent in said wash tank, a wash water conditioner disposed on said base and connected in fluid communication with said wash tank, said wash water conditioner contains material which removes contaminants containing oil from the wash water by absorbing the contaminants while being ineffective to remove detergent from the wash water, and a rinse water conditioner disposed on said base and connected in fluid communication with said rinse tank, said rinse water conditioner contains material which removes contaminants containing oil from the rinse water and which removes detergent from the rinse water.

13. An apparatus as set forth in claim 12 wherein the material which removes contaminant containing oil from the wash water and is ineffective to remove detergent from the wash water is formed of a porous polymer which is oleophyllic.

14. An apparatus as set forth in claim 12 wherein the material which removes contaminant containing oil from the wash water and is ineffective to remove detergent from the wash water is at least partially formed of copolymers which combine with oil in the contaminants containing oil in the wash water.

15. An apparatus as set forth in claim 12 wherein the material which removes contaminant containing oil from the wash water and is ineffective to remove detergent from the wash water is at least partially formed of polymers which absorb oil from the wash water and which change in molecular structure as the oil is absorbed.

16. An apparatus as set forth in claim 12 wherein the material which removes contaminant containing oil from the wash water and is ineffective to remove detergent from the wash water is at least partially formed of an elastomeric ethylene/alpha-olefin copolymer.

17. An apparatus as set forth in claim 12 wherein the material which removes contaminant containing oil from the wash water and is ineffective to remove detergent from the wash water is ineffective to absorb nonylphenoxypoly-ethyleneoxyethanol from the detergent contained in the wash water.

18. An apparatus as set forth in claim 12 wherein the material which removes contaminant containing oil from the wash water and is ineffective to remove detergent from the wash water is ineffective to absorb salt ingredients and primary and tertiary amines from the detergent contained in the wash water.

* * * * *